UNITED STATES PATENT OFFICE.

JARIG PHILIPPUS VAN DER PLOEG, OF THE HAGUE, NETHERLANDS.

TREATMENT OF ORES AND MATERIALS CONTAINING ANTIMONY.

SPECIFICATION forming part of Letters Patent No. 702,153, dated June 10, 1902.

Application filed June 25, 1901. Serial No. 65,957. (No specimens.)

*To all whom it may concern:*

Be it known that I, JARIG PHILIPPUS VAN DER PLOEG, a subject of the Queen of the Netherlands, residing at The Hague, Netherlands, have invented certain new and useful Improvements in Treatment of Ores and Materials Containing Antimony, of which the following is a specification.

The invention relates to improvements in the extraction of antimony from ores or other materials containing it, and is applicable for winning antimony from antimonious ores, oxidized or not, from antimony ores, from so-called "crude antimony" or antimony sulfid and the like, as well as for extracting antimony from complex ores of the class of fahlerz and the like containing in addition to antimony gold, silver, copper, tin, lead, zinc, arsenic, iron, or any other metal and for extracting antimony from ores wherein this metal occurs in other combinations than with sulfur and sulfids.

This invention for the treatment of antimony ores and materials containing antimony dispenses with the use of heat, whether for smelting or roasting or for heating solvents under pressure or not. In fact, it may be practiced under ordinary atmospheric conditions.

This invention consists in mixing powdered quicklime with the finely-ground sulfid ore of antimony, crude antimony, oxidized antimonious ore, or other matter containing antimony to be extracted or in grinding together the lime and ore or matter, there being added in either case a monosulfid or polysulfid of calcium or of magnesium in proportion according to the percentage of antimony in the ore or material and to the nature of the antimonial compound. When the water is subsequently added, soluble double sulfids of antimony and calcium or magnesium are formed, whereby all antimony contained in the ore or material under treatment is practically dissolved and may be drained off and washed out from the residues. The latter contain all the other metals, silica, and earths free from antimony. Although in this description the water is said to be added after the sulfid of calcium or magnesium, this order may be reversed without affecting the process.

The function of the quicklime, which is added to the ores to be treated for extraction of antimony by means of sulfid of calcium or magnesium, is that hereby the extraction of all the antimony from its ores and at the same time the formation of antimonial compounds containing antimony in its most soluble combination is effected. Moreover, the lower double-sulfur compounds of antimony with calcium or magnesium which are formed by this process constitute the best electrolytes for the subsequent electrolytic winning of metallic antimony. By the addition of adequate quantity of quicklime simultaneously with even the higher sulfids or polysulfids of calcium the most soluble and lower double-sulfur compounds of antimony and calcium will be formed.

The lixiviation process is preferably conducted in rotary vats for better mixing of the powdered materials and the liquid until the latter is saturated by the double sulfids of antimony and lime or magnesium. The separation of antimony from these double-sulfid solutions may be effected by electrolysis immediately after draining off and washing out and filtering from the residues, the solution being a true electrolyte. In this case the metal is separated as pure antimony; but it may be obtained as sulfid of antimony by addition of an adequate quantity of hydrochloric acid to the double-sulfid solution. If the precipitation of antimony from the sulfid solutions obtained is effected by electrolysis, the solvents when freed from the antimony may be used again for extracting further quantities of antimony from its ores by the addition of such a quantity of fresh sulfids and quicklime as the nature of the ores or materials to be treated requires. The present process is on this account highly economical. If the residues contain valuable metals in quantities which will pay for recovery, they are much more easily worked up after getting rid of the antimony than in presence of this metal or its compound. The residues being alkaline in their reactions, may be treated directly with cyanids and mercury or, for instance, with hyposulfites for winning any gold or silver they may contain.

By this process hitherto worthless antimonious ores, low-grade unsalable antimony ores, residues after picking out and concentration or washing antimonious or antimony ores and left at the mines, containing gold, silver, and other valuable metals or not, which could not formerly be profitably treated, may be treated by this simple and cheap process with profit both for extraction of antimony and afterward for the recovery of gold, silver, copper, lead, bismuth, molybdenum, tin, zinc, and all other valuable metals contained in the residues after treatment, for owing to the low cost of the materials for extracting the antimony there is in most cases a good profit in obtaining antimony sulfid by precipitation by hydrochloric acid from the double-sulfid solutions or even in recovering antimony as metal by electrolysis from the said solution or in manufacturing other compounds of antimony.

Although it is scientifically known that antimony sulfids are soluble in sulfids of alkalies and of the alkaline earths or even in solutions of alkalies and alkaline earths, scientific knowledge of the details has not hitherto led, by combination of the scientifically-known facts, to the practical solution of the metallurgical problem of extracting absolutely all the antimony from ores or materials containing it in such a cheap, complete, and effective way as is herein described, whereby, moreover, none of the other metals having the same chemical property as antimony of their sulfids being soluble in combination with sulfids of calcium or magnesium nor silica and earths are brought into solution along with the antimony.

What I claim, and desire to secure by Letters Patent of the United States, is—

1. The herein-described method of extracting antimony from ores, materials or residues containing it, consisting in finely pulverizing the material, mixing it with a suitable quantity of powdered quicklime and then mixing with it an adequate quantity of sulfid of an alkali-earth metal and water, so as to form a solution of the lower and most soluble double sulfids as being the best electrolytes, without the use of artificial heat or application of pressure.

2. The herein-described process of obtaining antimony from ores, materials, or residues containing it, consisting in finely pulverizing the material, mixing it with a suitable quantity of powdered quicklime and then mixing it with an adequate quantity of sulfid of an alkali-earth metal and water, so as to form a solution of the lower and most soluble double sulfids as being the best electrolytes without the use of artificial heat or application of pressure, and then extracting antimony from said solution.

3. The herein-described method of extracting antimony from ores, materials or residues containing it, consisting in finely pulverizing the material mixing it with a suitable quantity of powdered quicklime and then mixing with it an adequate quantity of sulfid of an alkali-earth metal and water so as to form a solution of the lower and most soluble double sulfids as being the best electrolytes without the use of artificial heat or application of pressure winning the antimony from said sulfid solution as a metal by electrolysis and then using several times the solution from which the antimony has been separated for treating new quantities of ores or materials containing antimony or until the antimony contents are practically completely extracted from the ores or materials containing antimony under treatment, new quantities of quicklime and sulfid of an alkali-earth metal being added according to the nature of the antimony compound.

In testimony whereof I have hereunto set my hand in the presence of two witnesses.

JARIG PHILIPPUS VAN DER PLOEG.

Witnesses:
GUALTHERUS Z. DE GROOT,
AIRE H. VOORWINDEN.